US012749323B2

(12) United States Patent
Rehfeld et al.

(10) Patent No.: US 12,749,323 B2
(45) Date of Patent: Sep. 29, 2026

(54) METHODS AND SYSTEMS FOR DETERMINING ONE OR MORE CHARACTERISTICS INSIDE A CABIN OF A VEHICLE

(71) Applicant: Aptiv Technologies AG, Schaffhausen (CH)

(72) Inventors: Timo Rehfeld, Cologne (DE); Lukas Hahn, Wuppertal (DE)

(73) Assignee: Aptiv Technologies AG, Schaffhausen (CH)

( * ) Notice: Subject to any disclaimer, the term of this patent is extended or adjusted under 35 U.S.C. 154(b) by 371 days.

(21) Appl. No.: 18/317,570

(22) Filed: May 15, 2023

(65) Prior Publication Data

US 2023/0377352 A1 Nov. 23, 2023

(30) Foreign Application Priority Data

May 19, 2022 (GB) ..................................... 2207316

(51) Int. Cl.
*G06V 20/59* (2022.01)
*G06V 10/25* (2022.01)
(Continued)

(52) U.S. Cl.
CPC ............ *G06V 20/593* (2022.01); *G06V 10/25* (2022.01); *G06V 10/26* (2022.01); *G06V 10/70* (2022.01)

(58) Field of Classification Search
CPC .................................................... G06V 20/593
See application file for complete search history.

(56) References Cited

U.S. PATENT DOCUMENTS

2004/0220705 A1* 11/2004 Basir ....................... G01S 3/786 701/1
2017/0068863 A1* 3/2017 Rattner .................. G06V 40/10
(Continued)

FOREIGN PATENT DOCUMENTS

| | | | |
|---|---|---|---|
| CN | 112154490 | A | 12/2020 |
| DE | 102013011533 | | 1/2015 |
| EP | 3848256 | | 7/2021 |

OTHER PUBLICATIONS

"Dielectric mirror—Wikipedia", Retrieved at: https://en.wikipedia.org/wiki/Dielectric_mirror—on Apr. 14, 2023, 3 pages.
(Continued)

*Primary Examiner* — Oneal R Mistry
(74) *Attorney, Agent, or Firm* — Harness, Dickey & Pierce, P.L.C.

(57) ABSTRACT

Methods and systems are described that implement determining one or more characteristics of the interior of a vehicle that lead to a reliable detection or observation of objects even if the direct line of sight between the objects and the camera is occluded. In an aspect, a computer implemented method includes the following operations carried out by computer hardware components: determining an image of an area of a cabin inside a vehicle using a sensor, the image including at least one first region representing the area reflected by at least one reflective surface provided in the cabin and at least one second region representing the area in a direct line of sight; and determining one or more characteristics inside the cabin of the vehicle based on at least one of: the at least one first region of the image; or the at least one second region of the image.

18 Claims, 3 Drawing Sheets

(51) Int. Cl.
*G06V 10/26* (2022.01)
*G06V 10/70* (2022.01)

(56) References Cited

U.S. PATENT DOCUMENTS

| | | | | |
|---|---|---|---|---|
| 2019/0355178 | A1* | 11/2019 | Hermina Martinez | G06V 20/593 |
| 2020/0320318 | A1* | 10/2020 | Ramaglia | G06V 20/59 |
| 2020/0327344 | A1 | 10/2020 | Nakagawa | |
| 2021/0012126 | A1* | 1/2021 | Porta | B60H 1/00742 |
| 2021/0256327 | A1* | 8/2021 | Peranandam | G06N 3/09 |
| 2021/0392297 | A1* | 12/2021 | Liu | G06V 20/597 |
| 2022/0398408 | A1* | 12/2022 | Shaik | G06V 20/593 |

OTHER PUBLICATIONS

"EPlastics Lucitelux IR Reflecting", Retrieved at: https://www.eplastics.com/lucitelux-ir-reflecting—on Apr. 14, 2023, 1 page.

"File:EM spectrum.svg—Wikipedia", Retrieved at: https://en.wikipedia.org/wiki/File:EM_spectrum.svg—on Apr. 14, 2023, 9 pages.

"Scale-invariant feature transform—Wikipedia", Retrieved at: https://en.wikipedia.org/wiki/Scale-invariant_feature_transform—on Apr. 14, 2023, 19 pages.

"Search Report", GB Application No. 2207316.7, Oct. 26, 2022, 4 pages.

"smart forvision: Infrared-Reflective Coating System and Polymer Film", https://web.archive.org/web/20120802131501/https://www.youtube.com/watch?v=YYQgUxqw-91, Sep. 9, 2011, 2 pages.

Jaderberg, et al., "Spatial Transformer Networks", Feb. 4, 2016, 15 pages.

Mohtaram, et al., "Amift: Affine-Mirror Invariant Feature Transform", Oct. 2018, 6 pages.

First Office Action regarding Chinese Patent Application No. 202310539705.X, dated Nov. 26, 2025. Translation provided by Google Translate.

* cited by examiner

METHODS AND SYSTEMS FOR DETERMINING ONE OR MORE CHARACTERISTICS INSIDE A CABIN OF A VEHICLE

INCORPORATION BY REFERENCE

This application claims priority to United Kingdom Patent Application No. GB2207316.7, filed May 19, 2022, the disclosure of which is incorporated by reference in its entirety.

BACKGROUND

Digital imaging devices, such as digital cameras, are used in automotive applications to observe the interior of a vehicle. In interior sensing applications, feature functions like seat occupancy detection and seatbelt recognition are fundamental building blocks for both convenience and safety-related system components. Cabin view cameras may be used, for example, to observe the interior of the vehicle.

However, it may frequently happen during normal driving scenarios that the way (in other words: the line of sight) between an area, for example rear seats of the vehicle, and the camera is occluded even for a longer period of time. This may lead to inaccurate observing results from the camera, or an observation of the area may be impossible at all.

It is therefore desirable for the system to determine one or more characteristics inside the interior of the vehicle even if a direct line of sight view between the area and the camera is occluded.

Accordingly, there is a need for methods and systems for determining one or more characteristics of the interior of a vehicle that lead to a reliable detection or observation of objects even if the direct line of sight between the objects and the camera is occluded.

SUMMARY

The present disclosure provides a computer implemented method, a computer system, a vehicle, and a non-transitory computer readable medium, including those described in the claims. Embodiments are given in the claims, the description, and the drawings.

In one aspect, the present disclosure is directed at a computer implemented method for determining one or more characteristics inside a cabin of a vehicle, the method comprises the following operations performed or carried out by computer hardware components: determining an image of an area of the cabin inside the vehicle using a sensor, wherein the image comprises at least one first region representing the area reflected by at least one reflective surface provided in the cabin and at least one second region representing the area in a direct line of sight; and determining the one or more characteristics inside the cabin of the vehicle based on the at least one first region of the image and/or based on the at least one second region of the image.

In other words, based on the at least one first region of the image an area inside the vehicle may be observed. In particular, characteristics inside the cabin of the vehicle may be determined, wherein the characteristics may describe, for example, a person or portions of a person, a child-seat, a bag, an empty seat, or the like. The person may be an adult or a child. Also, other kinds of objects like a mobile phone, a laptop, a box or a seat belt may be described by the characteristics. The image may be captured using a sensor and the image may comprise at least two regions, the first region and the second region. The first region of the image may represent an area of interest inside the vehicle. Also, the second region may represent that area inside the vehicle, e.g., the second region may represent the same area as the first region. The difference between the first region and the second region may be that the first region is based on electromagnetic waves that are reflected by a reflective surface inside the vehicle, and the second region is based on electromagnetic waves captured in a direct line of sight between the area and the sensor.

The cabin of the vehicle may be a passenger compartment of the vehicle, comprising passenger seats like front seats and rear seats or a rear bench. It will be understood that a plurality of seat rows may also be possible, for example three seat rows of a minivan. Additionally, the cabin may comprise different kind of storage spaces, for example, a center console or a rear window shelf. The cabin may be surrounded by a body of the car, wherein the body may comprise windows like a front shield, a rear window, side windows and/or a glass roof. The vehicle may be a car, for example a limousine, a minivan or a sports utility vehicle. On the other side, a vehicle according to various embodiments may also be a truck. Generally, each kind of transportation vehicle comprising a cabin may be a vehicle in the sense as described herein.

The sensor may be any kind of a sensor (e.g., digital imaging device) suitable to observe the interior of a vehicle, preferably a sensor configured to capture an image of the interior of the cabin of the vehicle. Therefore, the sensor may be a camera, preferably an infrared camera. The camera may comprise at least one lens to receive electromagnetic waves (light rays) around the sensor. The electromagnetic waves may be redirected to a single point, creating an image of the surrounding of the camera. The image may represent an area of interest in the surroundings of the sensor, in other words: an area in the field of view of the camera. The area may be represented in RGB (red, green, blue) colors, monochrome, or infrared colors by the image. The area may be inside the cabin and the area may be captured by the sensor directly or indirectly, wherein the term "directly" may mean that electromagnetic waves are captured by the camera in a direct line of sight between the area and the camera and the term "indirectly" may mean that electromagnetic waves may be reflected using a reflective surface before being captured using the camera. The area may be a (topologically) connected region inside the vehicle or the area may be a (topologically) non-connected region inside the vehicle (for example a plurality of subregions that are not connected together).

The area may comprise front seats, rear seats, seats of a third seat row, or storage surfaces of the vehicle. Also, portions of a passenger, for example a face of a passenger or an eye portion of the passenger to detect an awareness of the passenger may be the area as described herein. Additionally or alternatively, the area may be or may include a portion that includes a seat belt in the vehicle, for example a portion near a door of the vehicle, a portion of a chest of a passenger or a portion of a seat belt lock.

The image may comprise a plurality of regions, for example a first region and a second region. More than one first region may be provided. More than one second region may be provided. The first region may comprise a plurality of non-connected first subregions. The second region may comprise a plurality of non-connected second subregions. A region or subregion of the image may comprise a pixel of the image or a plurality of pixels of the image. The first region of the image may be of different size or same size than the second region of the image. The terms first and second do not refer to any particular order or sequence of the regions, but are used only to distinguish the two regions. The first region may represent the area and the second region may represent the area. The first region may be a region of the image showing a portion of a reflective surface, for example a glass roof. The area or parts of the area may be mirrored by the reflective surface such that the area is represented in the mirror. To represent the area, it is not needed to show the area in all details within the region of the image. It may be sufficient to recognize a visual signature or a structure in the region of the image that may be evaluated. The second region may be a region of the image in a direct line of sight between the area and the sensor. Electromagnetic waves for the second region are not reflected by the reflective surface before being captured by the sensor. The term "reflecting" may mean that the electromagnetic waves hit the reflective surface and at least one part of the electromagnetic waves is reflected or mirrored and sent back into the cabin of the vehicle.

It will be understood that determining characteristics may comprise a determination of characteristics, wherein the characteristics may be used for observing the cabin and observing the cabin may comprise an observation of the interior of the vehicle, for example to detect objects inside the cabin.

According to an embodiment, the first region may represent the area in an indirect line of sight. The first region may represent the area in an indirect way, where indirect may mean that the area is represented by a kind of mirror image. Thus, the first region may be based on electromagnetic waves captured by the sensor in an indirect line of sight between the area and the sensor. This means, the electromagnetic waves may be reflected by the reflective surface before being captured by the sensor.

According to an embodiment, the at least one reflective surface may be positioned in a roof area of the cabin. The at least one reflective surface may be a glass roof.

According to an embodiment, the at least one reflective surface may comprise a layer configured to reflect infrared radiation. The at least one reflective surface may be covered with the layer or the layer may be integrated in the reflective surface, for example, the layer may not be on a surface of the reflective surface but inside the reflective surface to enhance a reflection or to enable a reflection of a specific wavelength of the electromagnetic waves, for example infrared wavelength of about 780 nm to 1 mm of length. In other words, a roof module comprising the glass roof may be covered with a foil or a coating which is reflective to infrared (IR) light, wherein the foil or the coating is applied to a surface facing to the interior of the cabin. Thus, the method described herein may be used to optimize IR-based interior sensing applications. The reflective surface is not limited to a glass roof of the vehicle. Also, a window or any other kind of surface inside the vehicle, for example cover parts of the interior of the vehicle that are able to reflect electromagnetic waves, may be suitable as a reflective surface as described herein. The reflective surface may be a plain surface or a curved surface. Particularly, if the reflective surface is a glass roof, the glass roof may be curved. Additionally, the reflective surface may be sufficiently large to represent the area (in other words: sufficiently large so that when observed by the sensor, the reflected part covers the entire area), e.g. the reflective surface may cover or represent the whole area, e.g., no part of the area may be cropped by the size of the reflective surface.

According to an embodiment, the method may further comprise the following operation carried out by the computer hardware components: extracting each of the at least one first region and each of the at least one second region. The at least one first region and/or the at least one second region may be extracted (in other words: detected or selected) in the image using a selector. The selector may be based on machine learning techniques.

According to an embodiment, the method may further comprise the following operations carried out by the computer hardware components: cropping the at least one first region, extracted in the image, to generate at least one cropped first region; and/or cropping the at least one second region, extracted in the image, to generate at least one cropped second region; and determining the one or more characteristics inside the cabin of the vehicle based on the at least one cropped first region and/or based on the at least one cropped second region. Cropping may mean that the at least one first region and/or at least one second region, which are extracted in the image, may be separated or excluded from the image. Thus, not the entire image may be used for determining one or more characteristics inside the cabin of the vehicle, but only the at least one cropped first region and/or at least one cropped second region.

According to an embodiment, the method may further comprise the following operations carried out by the computer hardware components: determining whether the direct line of sight is occluded; and determining the one or more characteristics inside the cabin of the vehicle based on the at least one first region of the image when it is determined that the direct line of sight is occluded. An occlusion may be any object or interference between the sensor and the area. Thus, the area may not be representable by the second region if the direct line of sight is disturbed or obstructed. A determination of an occlusion of the direct line of sight may be based on using machine learning techniques.

According to an embodiment, the method may further comprise the following operations carried out by the computer hardware component: determining a first visual signature of the first region of the image at a first point of time; determining a second visual signature of the first region of the image at a second point of time; comparing the first visual signature and the second visual signature; determining the one or more characteristics related to an object in the area based on the comparison of the first visual signature and the second visual signature. The first visual signature may be predetermined, for example a first visual signature for a person, a child-seat, a bag or an empty seat may be predetermined in advance and stored.

The first point of time may be before (in other words: earlier than) the second point of time. It will be understood that a discrete sequence of points of time may be used, for example equidistant points of time, for example a point of time every pre-determined amount of seconds, for example every second, or every 1/10 of a second (e.g., 100 ms), or the like. The second point of time may be a current point of time or an arbitrary point of time. The second point of time may directly follow after the first point of time (in other words: no further point of time is between the second point of time and the first point of time). It will be understood that there may also be a discrete number of points of time between the second point of time and the first point of time.

According to an embodiment, the first point of time may be a point of time where the direct line of sight between the area and the sensor is not occluded. In other words, as long as the direct line of sight between the area and the sensor is not occluded, the first visual signature at the first point of time may be determined. Otherwise, if the direct line of sight between the area and the sensor is occluded, the second visual signature may be determined instead of the first visual signature.

According to an embodiment, the method may further comprise the following operation carried out by the computer hardware components: converting the at least one first region of the image into a converted region to correct a distortion in the at least one first region of the image, wherein the determining of the one or more characteristics may be based on the converted region of the image. Converting, in other words: a conversion, may be a transformation from one format into another format. The conversion may be carried out using a network, preferably an artificial neural network, of an end-to-end solution. The distortion may be a deformation or blurring of the geometrical reality in the first region of the image. Illustratively, for non-occluded situations, the converted region and the second region of the image may be at least substantially the same. A pixel at a position of the converted region and a pixel at the (corresponding) position of the second region may represent a corresponding portion of the area. The second region of the area may represent a frontal view of the area. Thus, the converted region of the first region of the area may also represent a frontal view of the area such that the converted region may be comparable to the second region of the area. The converted region of the area and the second region of the area may represent a corresponding frontal view of the area, e.g., the frontal view of the area represented by the converted region of the area may be at least substantially the same as the frontal view of the area represented by the second region of the area.

According to an embodiment, the converting may use a first machine learning technique and the determining of the one or more characteristics may use a second machine learning technique, wherein the first machine learning technique and the second machine learning technique are trained end-to-end. The machine learning techniques described herein may be based on an artificial neural network. For example, an artificial neural network for determining the one or more characteristics inside the cabin of the vehicle based on the image of the sensor may be trained together with another artificial neural network which may provide a method for converting the image before determining the one or more characteristics based on the converted region of the image. In other words, the artificial neural network and the other artificial neural network may not be trained individually, but in combination.

According to an embodiment, the determination of the one or more characteristics inside the cabin of the vehicle may use a machine learning technique.

According to an embodiment, the one or more characteristics may be related to an object, a person, a portion of a person, a child-seat, a bag, or an empty seat.

In another aspect, the present disclosure is directed at a computer system, said computer system comprising a plurality of computer hardware components configured to carry out several or all operations of the computer implemented method described herein. The computer system can be part of the vehicle.

The computer system may comprise a plurality of computer hardware components (for example a processor, for example processing unit or processing network, at least one memory, for example memory unit or memory network, and at least one non-transitory data storage). It will be understood that further computer hardware components may be provided, configured, and used for carrying out operations of the computer implemented method in the computer system. The non-transitory data storage and/or the memory unit may comprise a computer program for instructing the computer to perform several or all operations or aspects of the computer implemented method described herein, for example using the processing unit and the at least one memory unit.

In another aspect, the present disclosure is directed at a vehicle, comprising the computer system described herein, the sensor and the reflective surface, wherein the image is determined based on an output of the sensor. The sensor may be a camera, preferably an infrared camera. The reflective surface may be a glass roof.

The vehicle can be a car or truck and the sensor may be mounted in the vehicle. The sensor may be directed to an area inside the vehicle. Images may be captured by the sensor regardless if the vehicle is moving or not.

In another aspect, the present disclosure is directed at a non-transitory computer readable medium comprising instructions for carrying out several or all operations or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all operations or aspects of the computer implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

Figure 1:
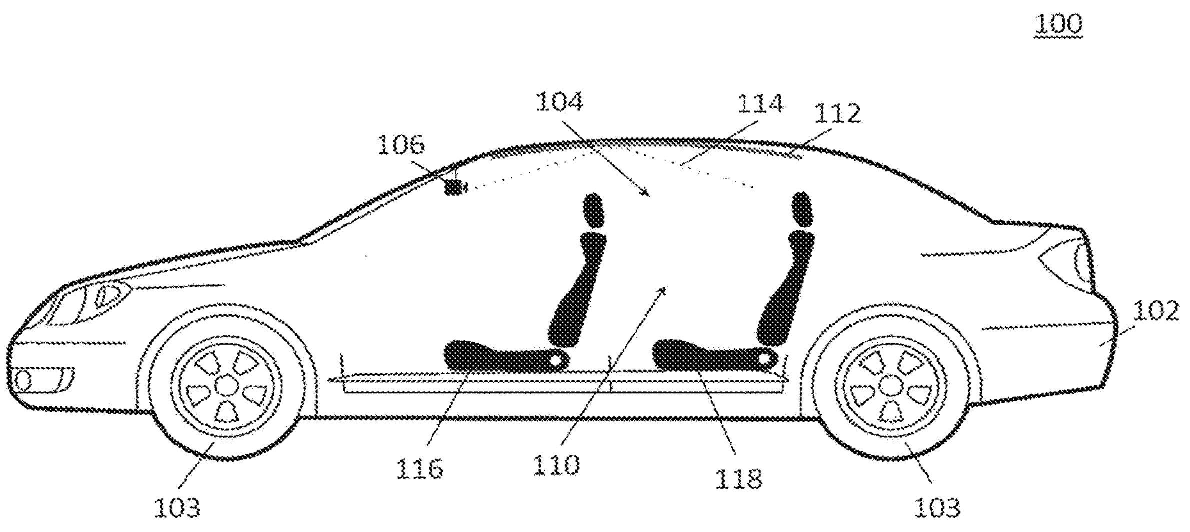
FIG. 1 illustrates a vehicle according to various embodiments.

The present disclosure relates to methods and systems for determining one or more characteristics inside a cabin of a vehicle.

Interior sensing systems of a cabin of a vehicle may be usually systems based on a single camera mounted within or close to the rearview mirror or at the top of the dashboard inside the cabin. An observation of an area inside the vehicle determined by the interior sensing system may be improved using wide-angle lenses in the camera that may allow a good coverage of the entire cabin, especially the front seats. However, the view of the rear seats may be easily obstructed. Some examples of an obstruction or an occlusion of the rear seats of a vehicle may be: a front passenger turning to the side, occluding almost the whole rear bench in the camera image; an adjustment of the rearview mirror by a front passenger, leading to a severe occlusion; a large male driver partially occluding a child seat on the seat behind him; or, in general, strong occlusions through larger passengers in the front seats.

Systems may try to mitigate the occlusion problem by mounting an (additional) ultra-wide-angle camera at a central position in the roof of the vehicle. Although this may enable a clear view for seat occupancy detection, other features like face detection, gaze direction estimation, awareness detection and seatbelt recognition or even video conferencing functions for example may become very difficult or almost impossible to execute under that angle of view. Since most automobile manufacturers may prefer a single-camera solution due to cost, packaging and computational reasons, mounting an ultra-wide-angle camera into the roof at a central position may be unfavorable.

According to various embodiments, to overcome the disadvantages of existing observation systems for an area inside the cabin of a vehicle, an additional region of the image, wherein the image is captured by the same camera, may be analyzed. The additional region may represent the area based on reflections of the area by at least one reflective surface provided in the cabin of the vehicle. Thus, an additional camera may be avoided.

As vehicles may more frequently be equipped with increasingly large curvy glass roofs, a use of the glass roof as a reflective surface may obtain a better view for example of the rear seats of the vehicle. More specifically, as a camera for interior sensing may operate in the infrared (IR) spectrum for a more even illumination during day and nighttime, the glass roof may be equipped with a foil that is translucent for human visible light but reflective to the range of wavelengths in the IR spectrum. For the visible spectrum of the human eye, the glass roof may remain transparent, thus not negatively affecting the passengers' view of the outside. Reflective coatings or foils as described herein are already used and known for heat control in vehicles for example. Also, other IR reflective surfaces like acryl glass elements (e.g., "Plexiglas®") reflect more than 75% of the natural IR radiation to serve the same purpose. Furthermore, dielectric mirrors may be designed to create ultra-high reflectivity surfaces or mirrors for a narrow range of wavelengths. It will be understood that the reflective surfaces described herein may also include other reflective materials or mirrors than mentioned herein.

The reflections on these surfaces may be leveraged to circumvent problems created by the aforementioned cases of occlusion, especially of characteristics, e.g., people, animals, objects etc., on the rear seats, without the need to resort to extreme mounting positions for a single camera or even multiple cameras. If both the cabin in a direct line of sight and its reflections on such a reflective surface are captured within the same camera image, algorithms may make use of both properties to increase performance, for example in terms of detection rates. As a practical implementation, an extraction of a region of the image showing a direct line of sight (in other words: a second region) of the interior may be used and an algorithm may detect characteristics of interest. Simultaneously, the same may be done on the additional region (in other words: a first region) of the image depicting the area with the reflections. If the relations of characteristics detected in the direct line of sight and characteristics detected in the additional region of the image representing the area by reflections in an indirect line of sight are known, whenever an instance of a characteristic is occluded in the direct line of sight, it can still be detected in the additional region. This may not only enable continuous detection but may provide support to reasoning and state analysis for interior sensing applications. For example, if a person sitting on a rear seat is occluded in the direct line of sight and leaves the vehicle or switches seats while this occlusion persists, a conventional approach only depending on the direct line of side may arrive at detecting a changed state in seat occupancy without any way to explain it. The additional use of detection and tracking of characteristics in the reflective surface resolves this problem by allowing for a continuous monitoring of the state.

Figure 2:
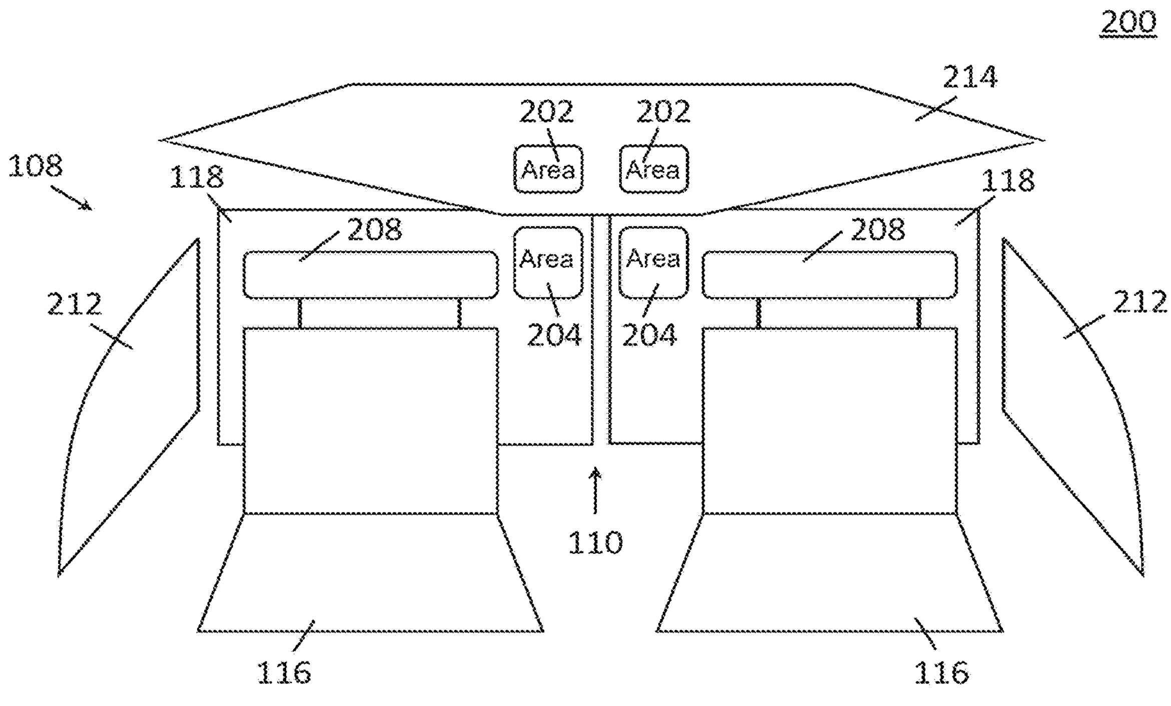
FIG. 2 illustrates an example of seat region definitions using a first region and a second region of the image according to various embodiments.

FIG. 1 shows a schematical representation of a vehicle 100 according to various embodiments. The vehicle 100, for example a passenger car may include a car body 102, wheels 103 and a cabin 104. The cabin 104 may be surrounded by the car body 102. The cabin 104 may include front seats 116, rear seats 118 and at least one reflective surface 112. The at least one reflective surface 112 may be positioned in a roof area of the cabin 104 and preferably be configured as a curved glass roof (which may also be referred to a sunroof) covered with a foil. Furthermore, a sensor 508, for example a camera 106, may be mounted inside the cabin 104 of the vehicle 100. The camera 106 may be facing inside the cabin 104 to capture an image 108 (for example an image 108 as shown in FIG. 2) of the cabin 104. The image 108 may include at least one area 110 of the cabin 104 inside the vehicle 100, wherein the area 110 may define a region of interest for an observation or for a determination of one or more characteristics. The area 110 may be preferably a region of the rear seats 118 of the vehicle 100, e.g., the area 110 may include at least one rear seat 118 of the vehicle 100.

To capture the area 110 using the camera 106, the area 110 has to be in a field of view of the camera 106. In one embodiment, the field of view of the camera 106 may be sufficiently large to see the full cabin 104, including the reflective surface 112 in a roof region of the vehicle 100. For example, the field of view of the camera 106 may be greater than or equal to 120 degree. Furthermore, the camera 106, for example mounted in a front of the cabin 104, facing rearwards against the driving direction of the vehicle 100, may not be mounted too close to the roof (in other words: too high), because otherwise the angle of incidence between rays of the camera 106 and the reflective surface 112 may be too shallow, in which case a mirrored image or a reflective image may not show sufficient coverage of the cabin 104 anymore. In one embodiment, the camera 106 may be placed close to a rearview mirror location of the vehicle 100, and in another embodiment, the camera 106 may be mounted in a dashboard of the vehicle 100. For example, with a lower position of the camera 106, a rear seat coverage may become worse in the direct line of sight between the area 110 of the rear seats 118 and the camera 106, but may become better in the mirrored image, wherein the mirrored image may represent the area in the indirect light of sight. A compromise between a coverage of the area 110 in the direct line of sight and a coverage of the area 110 in an indirect line of sight has to be found, based on the target feature set the camera 106 needs to fulfill.

The reflective surface 112 may be configured to reflect electromagnetic waves 114, especially infrared wavelengths with an electromagnetic spectrum greater than a spectrum visible for the human eye and thus, a mirrored line of sight or an indirect line of sight between the area 110 and the camera 106 may be defined by the reflected electromagnetic waves 114 as shown with a dotted line in FIG. 1. The indirect line of sight may be exemplified by a plurality of reflected lines between the area 110 and the sensor 508, wherein the reflected lines are reflected by the at least one reflective surface 112 of the cabin 104 provided in the vehicle 100.

FIG. 2 shows a schematical representation 200 of an image 108 of an area 110 of the cabin 104 inside the vehicle 100. The image 108 may include at least one first region 202 representing the area 110 and at least one second region 204 representing the area 110. The first region 202 of the image 108 may be determined based on electromagnetic waves 114 (in other words: a plurality of lines) reflected by a reflective surface 112 configured as a glass roof 214 provided in the cabin 104. The second region 204 of the image 108 may be determined based on electromagnetic waves 114 captured by the camera 106 in a direct line of sight (in other words: a plurality of straight lines) between the area 110 and the camera 106. As described herein, it may be essential to position the camera 106 and to choose the field of view of the camera 106 so that both regions (the first region 202 and the second region 204) of the image 108 may cover the area 110 sufficiently.

In FIG. 2, an area 110 for detecting an object in the area 110 based on one or more characteristics is shown. The object may preferably be a person, a portion of a person, a child-seat, a bag or an empty seat. The area 110 may include at least one rear seat 118 of the vehicle 100. The first region 202 may represent the area 110 and the second region 204 may represent the area 110, wherein the first region 202 as well as the second region 204 may be defined via a box or polygon (list of corner points) in the image 108. The first region 202 may differ in size from the second region 204 as shown in FIG. 2.

Determining one or more characteristics inside the cabin 104 of the vehicle 100 may be based on the at least one first region 202 of the image 108 and/or based on the at least one second region 204 of the image 108.

As shown in FIG. 2, the rear seats 118 may be partially occluded by front seats 116 in the image 108 captured by the camera 106. Also, parts of the front seats 116, like headrests 208 may interfere a direct line of sight between the rear seats 118 and the camera 106.

In the embodiment shown in FIG. 2, the reflective surface 112 is configured as a glass roof 214. The glass roof 214 may be covered with or may include a layer, for example a foil. The foil may be configured to highly reflect electromagnetic waves 114 of an infrared spectrum. Preferably, the glass roof 214 and thus, also the layer, may have a specific curvature to maximize a coverage of reflected cabin space. Also, the glass roof 214 may be sufficiently large in size to reflect the entire cabin 104 into the field of view of the camera 106. Additionally, or instead of the glass roof 214, other surfaces inside the cabin 104 may be configured as a reflective surface 112. For example, side windows 212 may also reflect an interesting area 110 like the rear seats 118.

Figure 3A:
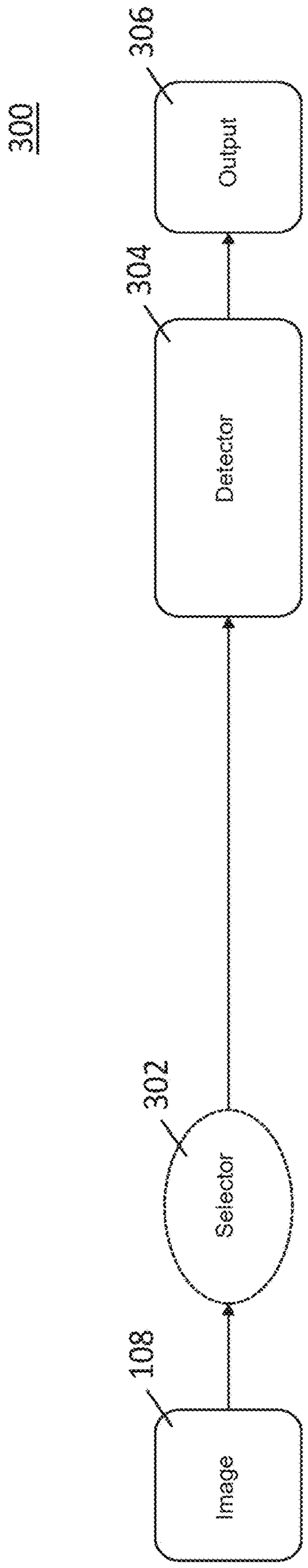
FIG. 3A illustrates a flow diagram of image processing operations according to various embodiments.
Figure 3B:
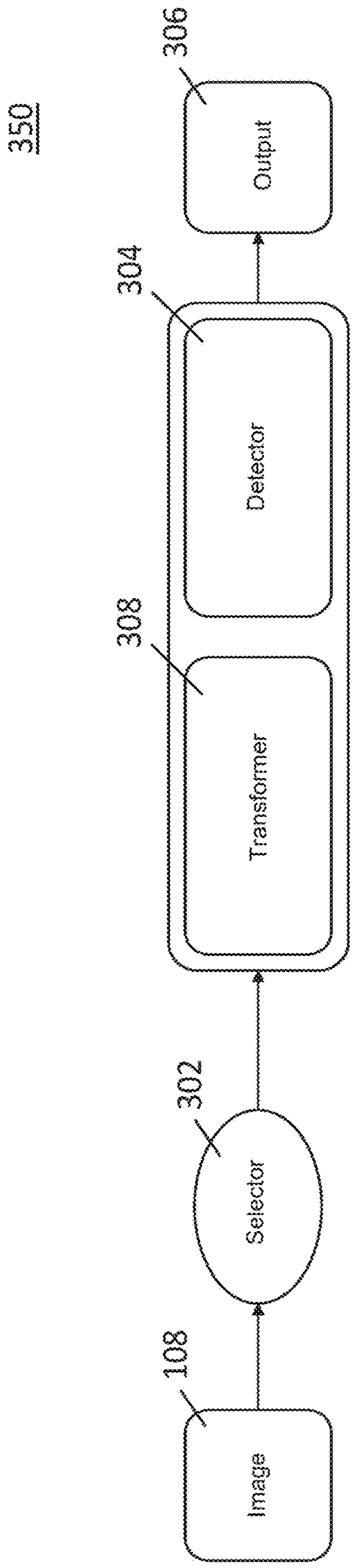
FIG. 3B illustrates a flow diagram of image processing operations according to various embodiments.

FIGS. 3A and 3B show flow diagrams 300, 350 illustrating image processing operations according to various embodiments. In FIG. 3A one or more characteristics or objects or a seat occupancy status may be detected directly based on an image 108 of the area 110, wherein in the first region 202 (as shown in FIG. 2) of the image 108 distortions may exist. The first region 202 that represents the area 110 as a reflected image in the glass roof 214 may be distorted with respect to the geometrical reality in the area 110 including the rear seats 118 of the vehicle 100. This, however, may be of little concern to the effectiveness of machine learning techniques that may be used to determining one or more characteristics in the interior of the cabin 104. The machine learning techniques may include a detector 304 or a classifier which may be trained in the same way, like it would be with an undistorted region of a frontal view image, for example the second region 204 as described herein.

The full image 108 captured by the camera 106 or a sensor 508 may be used to detect one or more characteristics or the objects or the seat occupancy status. The image 108 may be received by the detector 304 or classifier. The trained detector 304 may detect one or more characteristics within the image 108 and provide the detected characteristics as an output 306. As indicated in FIG. 3A with dotted lines, a region of the image 108, for example the at least one first region 202 and/or the at least one second region 204 may be extracted in the image 108 using a selector 302 before the region of the image 108 is transmitted to the detector 304.

The method described herein may include an operation of determining whether the direct line of sight is occluded using machine learning techniques.

Thus, for example only the first region 202 of the image 108 may be further used for determining the one or more characteristics inside the cabin 104 of the vehicle 100 when it is determined that the direct line of sight is occluded. It will be understood that determining the one or more characteristics inside the cabin 104 of the vehicle 100 may be based only on the second region 204 of the image 108 of the area 110 when the direct line of sight is not occluded or determining the one or more characteristics inside the cabin 104 of the vehicle 100 may be based on both regions, the first region 202 and the second region 204 of the image 108 of the area 110.

FIG. 3B shows another embodiment of image processing operations carried out directly on distorted reflections in the image 108 of the camera 106 but with an additional transformation to a (pseudo-)frontal view of a region of the image 108, for example the second region 204 of the image 108. In contrary to the embodiment shown in FIG. 3A, the distortions in the image 108 may be corrected before one or more characteristics or objects or a seat occupancy status are detected by the detector 304. Instead of working directly with the image 108 of the distorted reflections, the first region 202 extracted in the image 108 may be cropped out of the full image 108 using a selector 302 to generate at least one cropped first region. A transformation operation using a transformer 308 may be carried out to transform or convert the at least one cropped first region 202 of the image 108 into a transformed or converted region to correct the distortions in the at least one cropped first region 202 of the image 108. The transformation or correction of the at least one cropped first region 202 of the image 108 is carried out before the detector 304 or classifier obtains the converted region representing a (pseudo-) frontal view of the respective area 110. The transformation may be performed using a spatial transformer network or a combination of a fixed affine (linear) transformation and a spatial transformer network. The transformer 308 may consist of a combination of both transformation systems and together with the detector 304 may be integrated into one end-to-end solution, like an artificial neural network. Alternatively, features from state-of-the-art methods like SIFT (Scale Invariant Feature Transform) or AMIFT (Affine-Mirror Invariant Feature Transform) for example may be used to transform or convert the at least one cropped first region 202 of the image 108 into a (pseudo-) frontal view without distortions and to determine one or more characteristics or to detect objects in the transformed first region. Thus, determining the one or more characteristics inside the cabin 104 of the vehicle 100 may be based on the converted region of the image 108. The converted region of the image 108 may represent a (pseudo-) frontal view without distortions of the area 110 comparable to the second region 204 of the image 108. Illustratively, for non-occluded situations, the converted region and the second region 204 of the image 108 may be at least substantially the same, wherein a pixel at a position of the converted region and a pixel at the corresponding position of the second region 204 may represent a corresponding portion of the area 110.

The method described herein may be performed at different points of time. The determination of the one or more characteristics inside of the cabin 104 of the vehicle 100 may be based on the first region 202 and the second region 204 of the image 108 of the area 110. Accordingly, a first visual signature based on the first region 202 of the image 108 may be determined at a first point of time. The first point of time may be a point of time where the direct line of sight between the area 110 and the camera 106 is not occluded. Additionally, a second visual signature based on the first region 202 of the image 108 may be determined at a second point of time. The second point of time may be after the first point of time. The second point of time may be a point of time where the direct line of sight between the area 110 and the camera 106 is occluded.

The first visual signature and the second visual signature may represent an object in the area 110. To detect an object in the area 110, a comparison of the first visual signature and the second visual signature may be carried out. For example, if the first visual signature at a first point of time may represent an object, e.g., an object is detected in the first visual signature when the direct line of sight is not occluded, and the second visual signature at the second point of time when the direct line of sight is occluded may correspond to the first visual signature, the object may be verified. Otherwise, there is no object detected.

The first visual signature based on the first region 202 of the image 108 at the first point of time may be stored during a time period including the time between the first point of time and the second point of time. In other words, as long as the direct line of sight between the area 110 and the camera 106 is occluded, the first visual signature may be still kept persistent throughout the temporary occlusion. It may also be possible to store the first visual signature of the first region 202 for a predetermined time, independently from the second point of time. The predetermined time may be of any length, for example not limited by any constraints. A predetermined period of time may be dependent of an occlusion of the direct line of sight between the area 110 and the sensor 508, however, the predetermined period of time may also be independent of an occlusion of the direct line of sight, e.g., the predetermined period of time may be of any length.

In a further embodiment of the method described herein, a person on the rear seat 118 of the vehicle 100 may be visible in the direct line of sight of the camera 106, e.g., in the second region 204 of the image 108. The person may also be visible in the indirect line of sight, e.g., in the first region 202 of the image 108. In the second region 204, the person may be explicitly detectable as a person by a detection system or algorithm, for example the detector 304 described herein, whereas in the first region 202 the person may not be directly detectable as a person, e.g. because of distortion artifacts of the reflective surface 112. However, a first visual signature may be extracted of the first region 202 of the area 110 that may be stored over time, e.g., the first visual signature may be identifiable over time. If the person may be occluded in the second region 204 of the image 108, e.g., the direct line of sight between the person and the camera 106 is occluded, the person may not be detectable as a person based on the second region 204 anymore, because of the occlusion. However, the second visual signature of the first region 202 of the image 108 may still be determined since the indirect line of sight is not occluded. The second visual signature of the first region 202 may then be compared with the first visual signature of the first region 202 and the person may be detected on the rear seat 118 based on the comparison of the first visual signature and the second visual signature. The comparison of the first visual signature and the second visual signature may be carried out by comparing the first visual signature and the second visual signature of the first region 202. If the second visual signature of the first region 202 is similar to the first visual signature of the first region 202, it may be evaluated that the person must still be present on the rear seat 118 of the vehicle 100. This information may then be used to stabilize the overall system state and bridge temporary occlusion cases in the direct line of sight.

In another embodiment of the method described herein, computational resources of the detector 304 may be saved in the following way: instead of running the detector 304 in the direct line of sight region of the image 108, e.g., in the second region 204 of the image 108, for every frame, the detector 304 may be carried out only every N frames, wherein N may be a predetermined integer. One or more characteristics, or an object in the area 110 may be detected or classified by a comparison of the first visual signature of the first region 202 and the second visual signature of the first region 202 of the image 108, as long as there is no detection or classification of the object in the area 110 using the detector 304 in the second region 204 of the image 108. In other words, the second point of time may be a point of time where the detector 304 is not carried out in the direct line of sight region of the image 108, e.g., in the second region 204 of the image 108. The first visual signature based on the first region 202 of the image 108 at the first point of time may be stored during a time period when the detector 304 is not running in the direct line of sight region of the image 108. Thus, as long as there is no detection of a characteristic or an object based on the second region 204, the first visual signature may be still kept persistent. The detector 304 or classifier may be carried out using the second region 204 of the image 108 again, if a characteristic or an object may not be confirmed using the comparison of the first visual signature of the first region 202 and the second visual signature of the first region 202 of the image 108, which may be caused by a strong visual appearance change in the image 108.

This process may assume that tracking takes less resource than detection, which is commonly the case.

Figure 4:
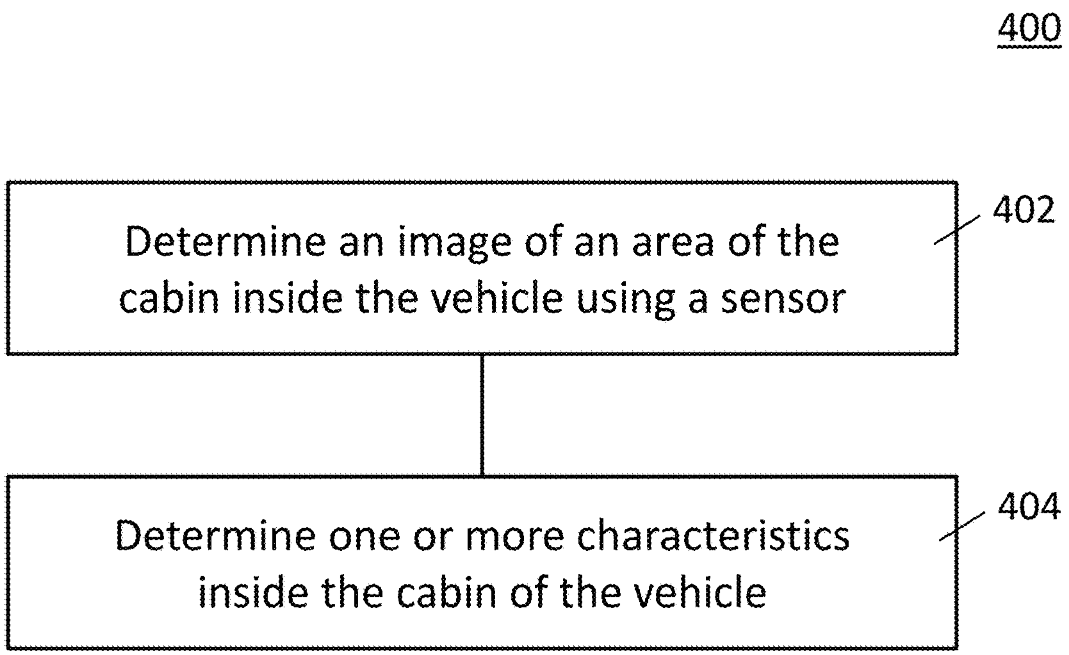
FIG. 4 illustrates a flow diagram illustrating a method for determining one or more characteristics inside a cabin of a vehicle according to various embodiments.

FIG. 4 shows a flow diagram 400 illustrating a method for determining the one or more characteristics inside a cabin of a vehicle according to various embodiments. At 402, an image of an area of the cabin inside the vehicle may be determined using a sensor. The image may include at least one first region representing the area reflected by at least one reflective surface provided in the cabin and at least one second region representing the area in a direct line of sight. At 404, one or more characteristics may be determined inside the cabin of the vehicle based on the at least one first region of the image and/or based on the at least one second region (204) of the image.

According to various embodiments, the first region may represent the area in an indirect line of sight.

According to various embodiments, the at least one reflective surface may be positioned in a roof area of the cabin, and/or the at least one reflective surface may comprise a layer configured to reflect infrared radiation.

According to various embodiments, the method may further include: extracting each of the at least one first region and each of the at least one second region.

According to various embodiments, the method may further include: cropping the at least one first region, extracted in the image, to generate at least one cropped first region; and/or cropping the at least one second region, extracted in the image, to generate at least one cropped second region; and determining the one or more characteristics inside the cabin of the vehicle based on the at least one cropped first region and/or based on the at least one cropped second region.

According to various embodiments, the method may further include: determining whether the direct line of sight is occluded; and determining the one or more characteristics inside the cabin of the vehicle based on the at least one first region of the image when it is determined that the direct line of sight is occluded.

According to various embodiments, the method may further include: determining a first visual signature of the first region of the image at a first point of time; determining a second visual signature of the first region of the image at a second point of time; comparing the first visual signature and the second visual signature; and determining the one or more characteristics related to an object in the area based on the comparison of the first visual signature and the second visual signature.

According to various embodiments, the first point of time may be a point of time where the direct line of sight is not occluded.

According to various embodiments, the method may further include: converting the at least one first region of the image into a converted region to correct a distortion in the at least one first region of the image, wherein the determining of the one or more characteristics is based on the converted region of the image.

According to various embodiments, the converting may use a first machine learning technique and the determining of the one or more characteristics may use a second machine learning technique, wherein the first machine learning technique and the second machine learning technique may be trained end-to-end.

According to various embodiments, the determination of the one or more characteristics inside the cabin of the vehicle may use a machine learning technique.

According to various embodiments, the one or more characteristics may be related to an object, a person, a portion of a person, a child-seat, a bag, or an empty seat.

Each of the operations 402, 404, and the further operations described above may be performed by computer hardware components, for example as described with reference to FIG. 5.

Figure 5:
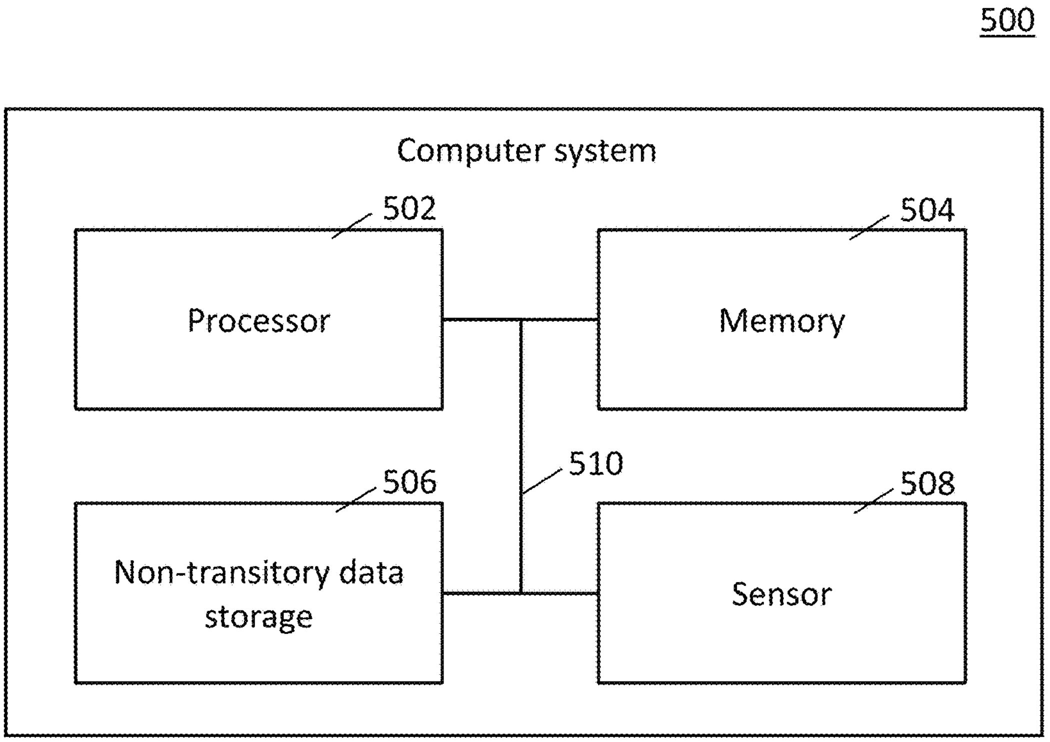
FIG. 5 illustrates a computer system with a plurality of computer hardware components configured to carry out operations of a computer implemented method for determining one or more characteristics inside a cabin of a vehicle according to various embodiments.

FIG. 5 shows a computer system 500 with a plurality of computer hardware components configured to carry out operations of a computer implemented method for determining one or more characteristics inside a cabin of a vehicle according to various embodiments. The computer system 500 may include a processor 502, a memory 504, and a non-transitory data storage 506. A sensor 508 (for example the camera 106) may be provided as part of the computer system 500 (like illustrated in FIG. 5), or may be provided external to the computer system 500.

The processor 502 may carry out instructions provided in the memory 504. The non-transitory data storage 506 may store a computer program, including the instructions that may be transferred to the memory 504 and then executed by the processor 502. The sensor 508 may be used to determine an image, for example the image 108 of the area 110 of the cabin 104 inside the vehicle 100 as described herein.

The processor 502, the memory 504, and the non-transitory data storage 506 may be coupled with each other, e.g. via an electrical connection 510, such as e.g. a cable or a computer bus or via any other suitable electrical connection 510 to exchange electrical signals. The camera 106 may be coupled to the computer system 500, for example via an external interface, or may be provided as parts of the computer system (in other words: internal to the computer system, for example coupled via the electrical connection 510).

The terms "coupling" or "connection" are intended to include a direct "coupling" (for example via a physical link) or direct "connection" as well as an indirect "coupling" or indirect "connection" (for example via a logical link), respectively.

It will be understood that what has been described for one of the methods above may analogously hold true for the computer system 500.

Although implementations for methods and systems for determining one or more characteristics inside a cabin of a vehicle have been described in language specific to certain features and/or methods, the subject of the appended claims is not necessarily limited to the specific features or methods described. Rather, the specific features and methods are disclosed as example implementations for methods and systems for determining one or more characteristics inside a cabin of a vehicle.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

REFERENCE NUMERAL LIST

100 vehicle according to various embodiments
102 car body
103 wheel
104 cabin
106 camera
108 image
110 area
112 reflective surface
114 electromagnetic waves

116 front seat
118 rear seat
200 schematical representation of an image according to various embodiments
202 first region
204 second region
208 headrest
212 side window
214 glass roof
300 flow diagram illustrating image processing operations according to various embodiments
302 selector
304 detector
306 output
308 transformer
350 flow diagram illustrating image processing operations according to various embodiments
400 flow diagram illustrating a method for determining one or more characteristics inside a cabin of a vehicle according to various embodiments
402 operation of determining an image of an area of the cabin inside the vehicle using a sensor
404 operation of determining one or more characteristics inside the cabin of the vehicle
500 computer system according to various embodiments
502 processor
504 memory
506 non-transitory data storage
508 sensor
510 connection

What is claimed is:

1. A computer-implemented method comprising the following operations carried out by computer hardware components:
   - determining an image of an area of a cabin inside a vehicle using a sensor, the image comprising at least one first region representing at least a portion of an area reflected by at least one reflective surface provided in the cabin and at least one second region representing at least a portion of an area in a direct line of sight; and
   - determining one or more characteristics inside the cabin of the vehicle only based on at least one of:
     - the at least one first region of the image; or
     - the at least one second region of the image,
     - wherein the first region represents the at least a portion of an area in an indirect line of sight,
     - wherein the at least one reflective surface is positioned in a roof area of the cabin, and
     - wherein the at least one reflective surface comprises a layer configured to reflect infrared radiation.

2. The method of claim 1, wherein the at least one first region represents at least a portion of an area in an indirect line of sight.

3. The method of claim 1, further comprising at least one of:
   - wherein the at least one reflective surface is positioned in a roof area of the cabin, or
   - wherein the at least one reflective surface comprises a layer configured to reflect infrared radiation.

4. The method of claim 1, further comprising:
   - extracting each of the at least one first region and each of the at least one second region.

5. The method of claim 4, further comprising:
   - cropping the at least one first region, extracted in the image, to generate at least one cropped first region.

6. The method of claim 5, further comprising:
   - cropping the at least one second region, extracted in the image, to generate at least one cropped second region; and
   - determining the one or more characteristics inside the cabin of the vehicle based on at least one of:
     - the at least one cropped first region, or
     - the at least one cropped second region.

7. The method of claim 1, further comprising:
   - determining a first visual signature of the first region of the image at a first point of time;
   - determining a second visual signature of the first region of the image at a second point of time;
   - comparing the first visual signature and the second visual signature; and
   - determining the one or more characteristics related to an object in the area based on the comparison of the first visual signature and the second visual signature.

8. The method of claim 1, further comprising:
   - determining that the direct line of sight is occluded;
   - determining the one or more characteristics inside the cabin of the vehicle based on the at least one first region of the image responsive to determining that the direct line of sight is occluded;
   - determining a first visual signature of the first region of the image at a first point of time;
   - determining a second visual signature of the first region of the image at a second point of time;
   - comparing the first visual signature and the second visual signature; and
   - determining the one or more characteristics related to an object in the area based on the comparison of the first visual signature and the second visual signature.

9. The method of claim 8, wherein the first point of time is a point of time where the direct line of sight is not occluded.

10. The method of claim 1, further comprising:
    - extracting each of the at least one first region and each of the at least one second region;
    - determining a first visual signature of the at least one first region of the image at a first point of time;
    - determining a second visual signature of the at least one first region of the image at a second point of time;
    - comparing the first visual signature and the second visual signature; and
    - determining the one or more characteristics related to an object in the area based on the comparison of the first visual signature and the second visual signature.

11. The method of claim 1, further comprising:
    - converting the at least one first region of the image into a converted region to correct a distortion in the at least one first region of the image, wherein the determining of the one or more characteristics is based on the converted region of the image.

12. The method of claim 11,
    - wherein the converting uses a first machine learning technique,
    - wherein the determining of the one or more characteristics uses a second machine learning technique, and
    - wherein the first machine learning technique and the second machine learning technique are trained end-to-end.

13. The method of claim 12, wherein the determination of the one or more characteristics inside the cabin of the vehicle uses a machine learning technique.

14. The method of claim 1, wherein the determination of the one or more characteristics inside the cabin of the vehicle uses a machine learning technique.

15. The method of claim 1, wherein the one or more characteristics is related to at least one of an object, a person, a portion of a person, a child-seat, a bag, or an empty seat.

16. A computer system comprising a plurality of computer hardware components configured to:

determine an image of an area of a cabin inside a vehicle using a sensor, the image comprising at least one first region representing at least a portion of an area reflected by at least one reflective surface provided in the cabin and at least one second region representing at least a portion of an area in a direct line of sight; and determine one or more characteristics inside the cabin of the vehicle only based on at least one of:

the at least one first region of the image; or the at least one second region of the image, wherein the first region represents the at least a portion of an area in an indirect line of sight, wherein the at least one reflective surface is positioned in a roof area of the cabin, and wherein the at least one reflective surface comprises a layer configured to reflect infrared radiation.

17. The computer system of claim 16, further comprising:

the vehicle;

the sensor; and the at least one reflective surface.

18. A non-transitory computer readable medium comprising instructions that when executed, configure computer hardware components to:

determine an image of an area of a cabin inside a vehicle using a sensor, the image comprising at least one first region representing at least a portion of an area reflected by at least one reflective surface provided in the cabin and at least one second region representing at least a portion of an area in a direct line of sight; and determine one or more characteristics inside the cabin of the vehicle only based on at least one of:

the at least one first region of the image; or the at least one second region of the image, wherein the first region represents the at least a portion of an area in an indirect line of sight, wherein the at least one reflective surface is positioned in a roof area of the cabin, and wherein the at least one reflective surface comprises a layer configured to reflect infrared radiation.

* * * * *